(12) United States Patent
Herz

(10) Patent No.: US 8,282,152 B2
(45) Date of Patent: Oct. 9, 2012

(54) SEALING MECHANISM FOR A COLLAPSIBLE ROOF

(75) Inventor: Konrad Herz, Weissach (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/185,730

(22) Filed: Jul. 19, 2011

(65) Prior Publication Data

US 2012/0025561 A1  Feb. 2, 2012

(30) Foreign Application Priority Data

Jul. 20, 2010  (DE) .......................... 10 2010 027 606

(51) Int. Cl.
 *B60J 7/12* (2006.01)
 *B60J 10/10* (2006.01)
(52) U.S. Cl. ................ 296/107.04; 296/135; 296/146.9; 49/480.1; 49/483.1; 49/484.1; 49/489.1; 49/490.1; 49/495.1; 49/498.1

(58) Field of Classification Search ............. 296/107.04, 296/107.05, 135, 146.8, 146.9; 49/480.1, 49/483.1, 484.1, 489.1, 490.1, 492.1, 495.1, 49/498.1
See application file for complete search history.

(56) References Cited

U.S. PATENT DOCUMENTS 4,266,824 A * 5/1981 Inamoto ........................ 296/210

FOREIGN PATENT DOCUMENTS

| DE | 295009880 U1 | 9/1995 |
| EP | 0806313 A1 | 11/1997 |
| JP | 2006-248409 * | 9/2006 |

* cited by examiner

*Primary Examiner* — Dennis Pedder
(74) *Attorney, Agent, or Firm* — Brooks Kushman P.C.

(57) ABSTRACT

A collapsible roof assembly for a vehicle includes a collapsible roof and a sealing mechanism. The roof has a top rail with a frame element running along a longitudinal side of the roof. The sealing mechanism has a seal configured to receive and seal a window pane inserted therein, wherein the seal runs along the longitudinal side of the roof and is attached to the frame element. The seal has a similar cross-section between front, middle, and rear sections of the roof. The seal is attached to the frame element in a form-fit manner in the front section of the roof and is attached to the frame element in a force-fitted manner in the middle section of the roof.

13 Claims, 4 Drawing Sheets

SEALING MECHANISM FOR A COLLAPSIBLE ROOF

CROSS-REFERENCE TO RELATED APPLICATIONS

This application claims foreign priority benefits under 35 U.S.C. §119(a)-(d) to DE 10 2010 027 606.5, filed Jul. 20, 2010, which is hereby incorporated by reference in its entirety.

TECHNICAL FIELD

The present invention relates to a sealing mechanism for a collapsible roof of a convertible vehicle.

BACKGROUND

EP 0 806 313 B1 describes a convertible vehicle having a folding top supported by a roof frame. A roof cap is in the front region of the roof frame. Side frames are attached to the roof cap. Each side frame supports a seal for a window pane and is in contact with the folding top through a support piece.

DE 295 09 880 U1 describes a sealing profile for a collapsible roof of a convertible vehicle. The sealing profile includes a metallic support and is fastened to a roof guide. First and second lips molded onto the sealing profile cooperate with inner and outer sides of a window pane. A third lip of the sealing profile is supported on a pocket of an inner side of the cloth cover of the roof. A tensioning cable is in the pocket.

SUMMARY

An object of the present invention includes a sealing mechanism for a collapsible roof of a vehicle in which the sealing mechanism has a seal that is configured to pass along the upper edge zone of a closed window pane and can be integrated without difficulty into a given collapsible roof structure.

In carrying out the above object and other objects, the present invention provides an assembly for a vehicle. The assembly includes a collapsible roof and a sealing mechanism. The roof has a top rail with a frame element running along a longitudinal side of the roof. The seal is configured to receive and seal a window pane inserted therein. The seal runs along the longitudinal side of the roof and is attached to the frame element. The seal has a similar cross-section between front, middle, and rear sections of the roof. The seal is attached to the frame element in a form-fit manner in the front section of the roof and is attached to the frame element in a force-fitted manner in the middle section of the roof.

Also, in carrying out the above object and other objects, the present invention provides a vehicle having a vehicle body, a collapsible roof, and a sealing mechanism. The vehicle body has a side door on a longitudinal side of the vehicle body and a movable window pane associated with the side door. The roof has a flexible cover and a top rail supporting the cover. The top rail is movable to a closed position in which the cover extends over a passenger compartment of the vehicle body with the top rail extending along the longitudinal side of the vehicle body. The top rail includes a frame element running along a longitudinal side of the roof. The sealing mechanism has a seal running along the longitudinal side of the roof and attached to the frame element. The seal is configured to receive and seal a window pane inserted therein when the roof is in the closed position. The seal has a similar cross-section between front, middle, and rear sections of the roof. The seal is attached to the frame element in a form-fit manner in the front section of the roof and is attached to the frame element in a force-fitted manner in the middle section of the roof.

Embodiments of the present invention provide a sealing mechanism for a collapsible roof (convertible roof, folding top, etc.) of a passenger vehicle. Each seal of the sealing mechanism between the front, middle, and rear sections of the collapsible roof has the same or similar effective cross-section. This design contributes to good seal functionality and relatively advantageous seal fabrication, for example, by extrusion. The seal permits the upper edge zone of a window pane to be inserted into the collapsible roof structure. The structurally simply designed type of attachment (namely, form-fitting and/or force-fitting) of the seal to the frame element of the top rail of the collapsible roof is an aspect of embodiments of the present invention. The seal includes facing outer and inner tubing sections. The tubing sections have sealing sections of different thicknesses that furnish support on the outer and inner sides of the upper edge zone of a closed window pane inserted into the seal to thereby seal the window pane.

An embodiment of the present invention provides a sealing mechanism for a collapsible roof of a vehicle. The sealing mechanism has a contiguous seal proceeding from the upper edge zone of a closed window pane. The roof includes a cloth top and is movably connected to the vehicle body to be movable between closed and opened positions. The roof includes a top rail with frame elements extending along the respective upper edge zone of the closed window pane. The appropriate seal is located between the frame elements and folding top zones of the collapsible roof and is held in position on the frame elements. The seal includes an equal and functionally similar cross section between front, middle, and rear sections of the roof and is retained on the corresponding frame element by form-fitting or force-fitting means.

The above features, and other features and advantages of the present invention are readily apparent from the following detailed description thereof when taken in connection with the accompanying drawings.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
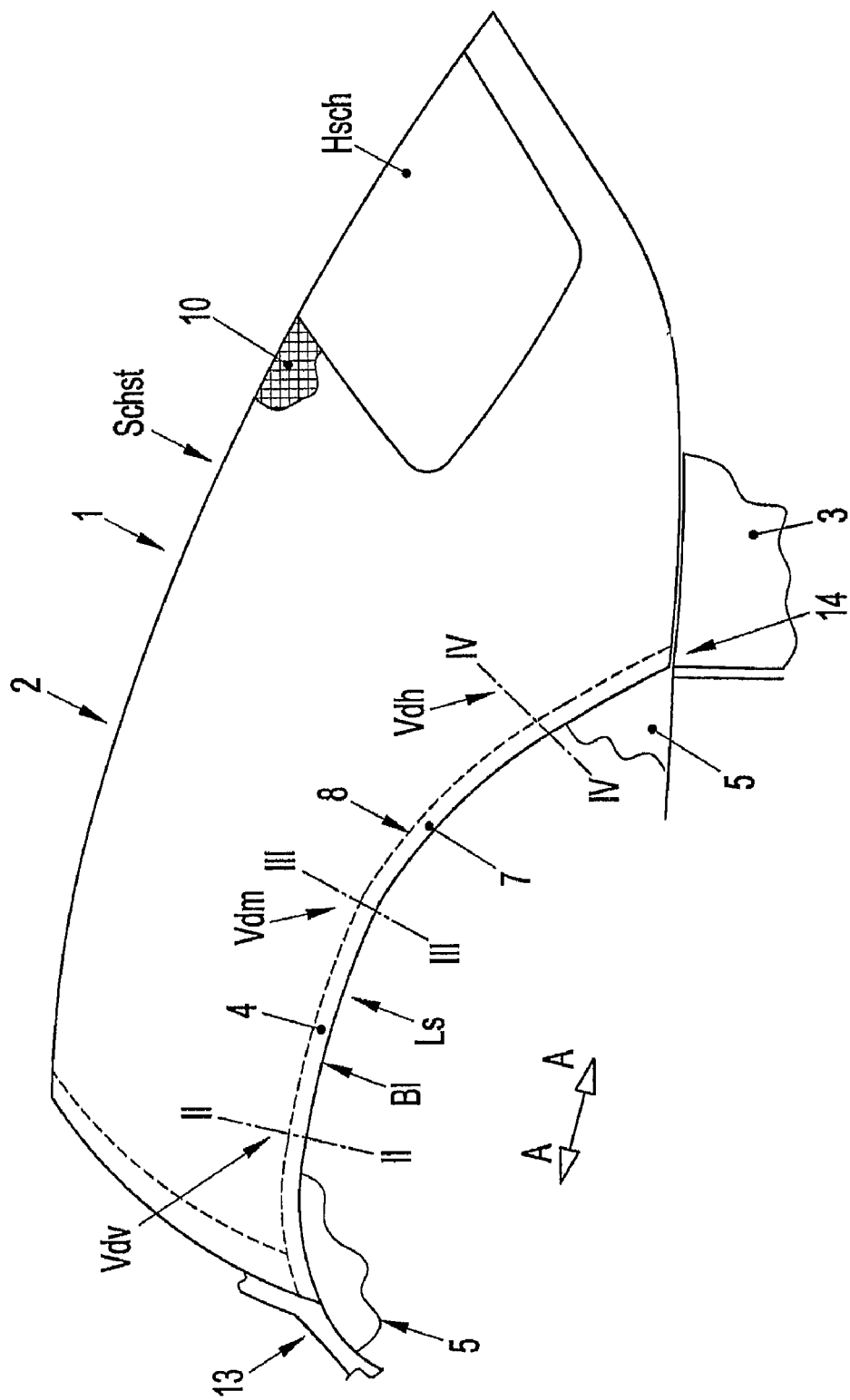
FIG. 1 illustrates a schematic oblique view of a collapsible roof for a passenger vehicle in accordance with an embodiment of the present invention.

Referring now to FIG. 1, a schematic oblique view of a collapsible roof 2 for a passenger vehicle 1 in accordance with an embodiment of the present invention is shown. Vehicle 1 has a vehicle body 3 having a front end and a rear end. Roof 2 is designed as a folding top structure having a flexible cloth cover 10 and a pair of top rails 9. Each top rail 9 is on a respective longitudinal side Ls of roof 2 and supports cover 10. Roof 2 is movably connected to vehicle body 3 to be movable between a closed position Schst (shown in FIG. 1) and an opened position. In the closed position, roof 2 arches over and covers a passenger compartment of vehicle 1, longitudinal sides Ls of roof 2 extend along longitudinal direction A-A of vehicle 1, and the front portion of roof 2 borders a windshield frame 13 of the front end of vehicle body 3. In the opened position, roof 2 is rearwardly lowered into a storage compartment (e.g., trunk) in the rear end of vehicle body 3. Cover 10 includes a rear window Hsch in a rearward region of roof 2.

Vehicle body 3 further includes one or more side doors on each longitudinal side of vehicle body 3. Each side door has an associated window pane 5. Each window pane 5 is movably adjustable in height between closed and opened window positions relative to the associated side door. When window pane 5 of a side door is in the closed window position, the upper edge zone 4 of the pane borders the corresponding longitudinal side Ls of collapsible roof 2.

A sealing mechanism 7 runs along each longitudinal side Ls of roof 2. Sealing mechanism 7 is intended to seal with the upper edge zone 4 of a window pane 5 when the pane is in the closed window position and borders the corresponding longitudinal side Ls of roof 2. Sealing mechanism 7 and a frame element 8 of top rail 9 proceed next to the upper edge zone 4 of window pane 5 when the pane is in the closed window position.

Figure 2:
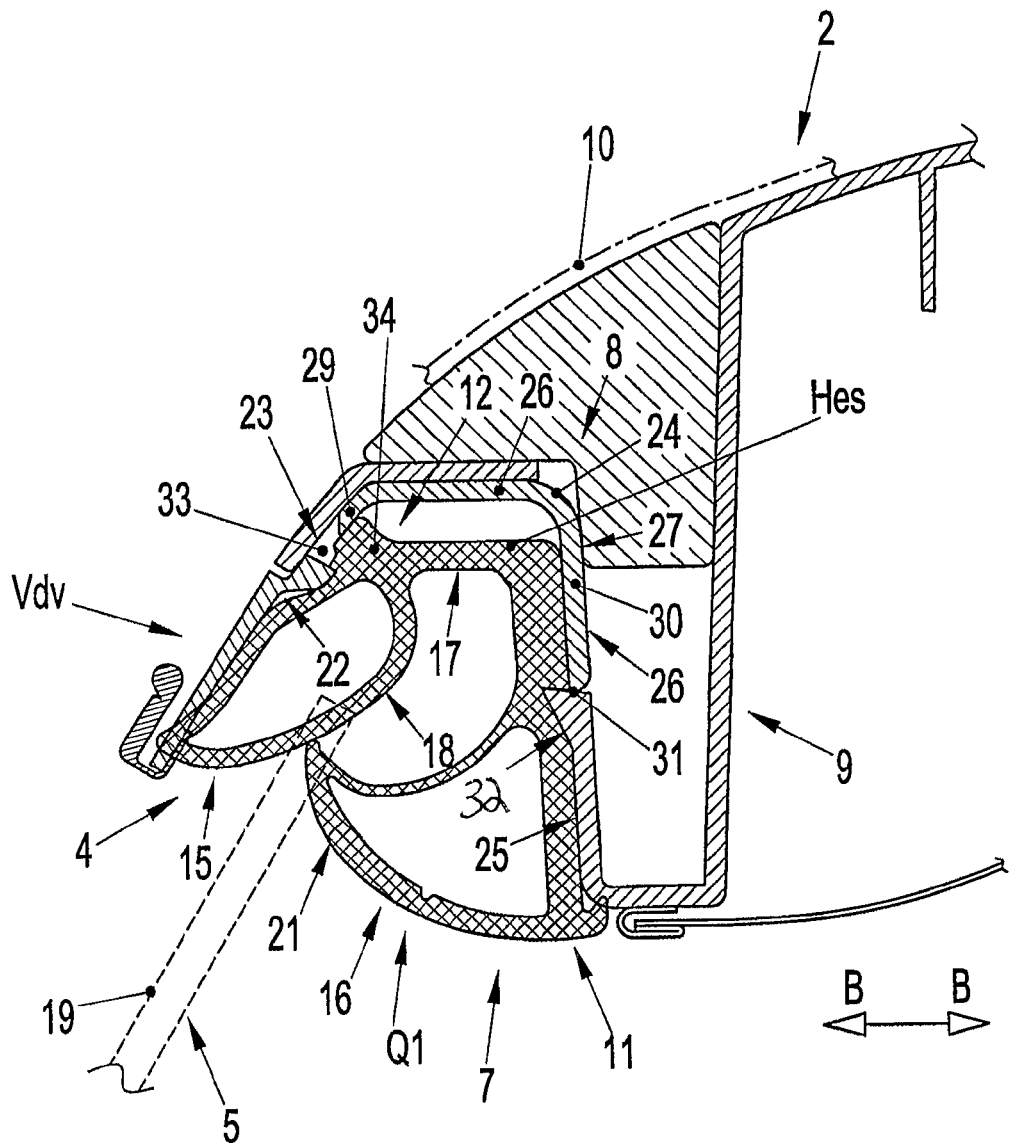
FIG. 2 illustrates an enlarged cross-sectional view along sectional line II-II of FIG. 1 in a front section of the collapsible roof.
Figure 3:
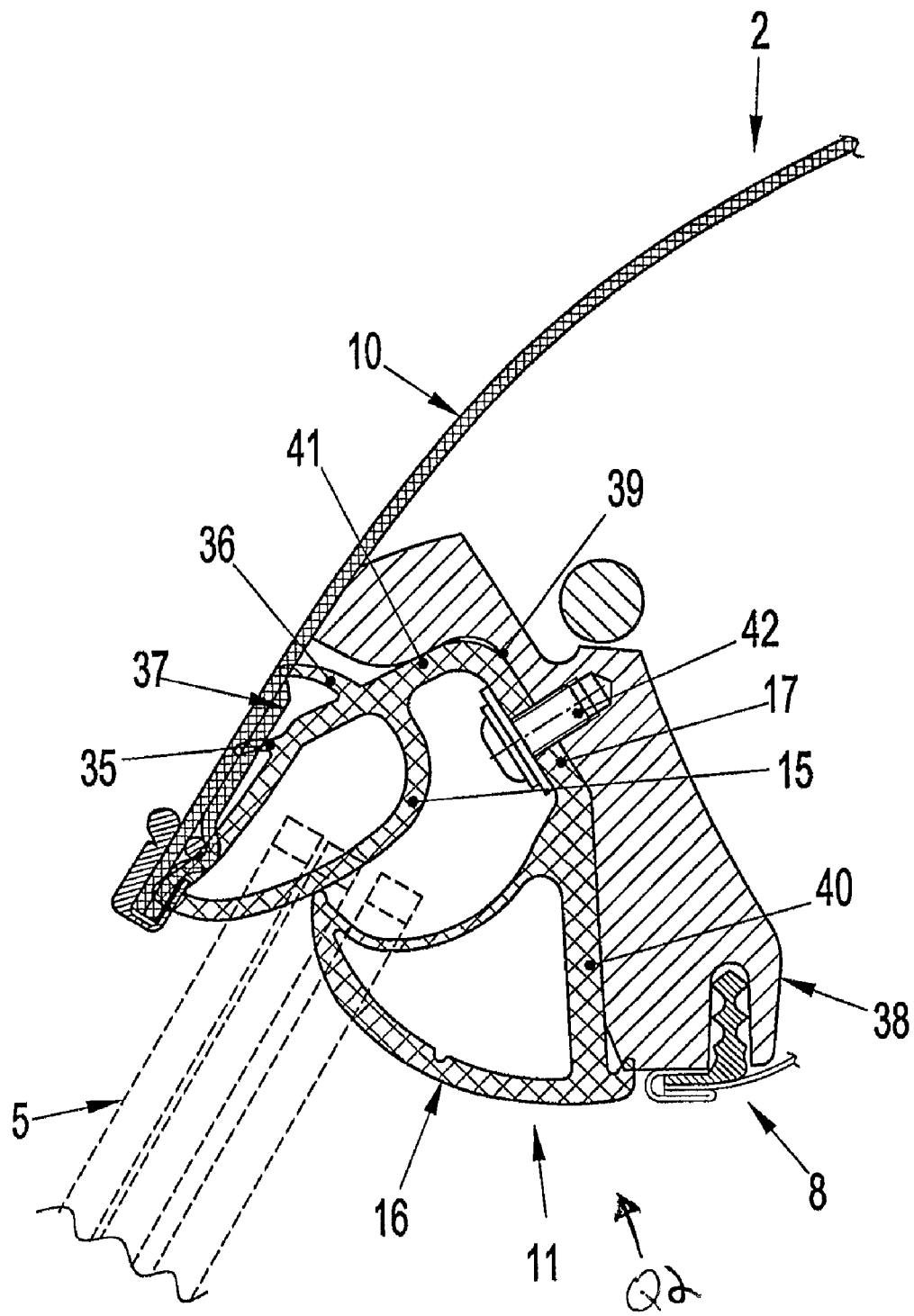
FIG. 3 illustrates an enlarged cross-sectional view along sectional line III-III of FIG. 1 in a middle section of the collapsible roof.
Figure 4:
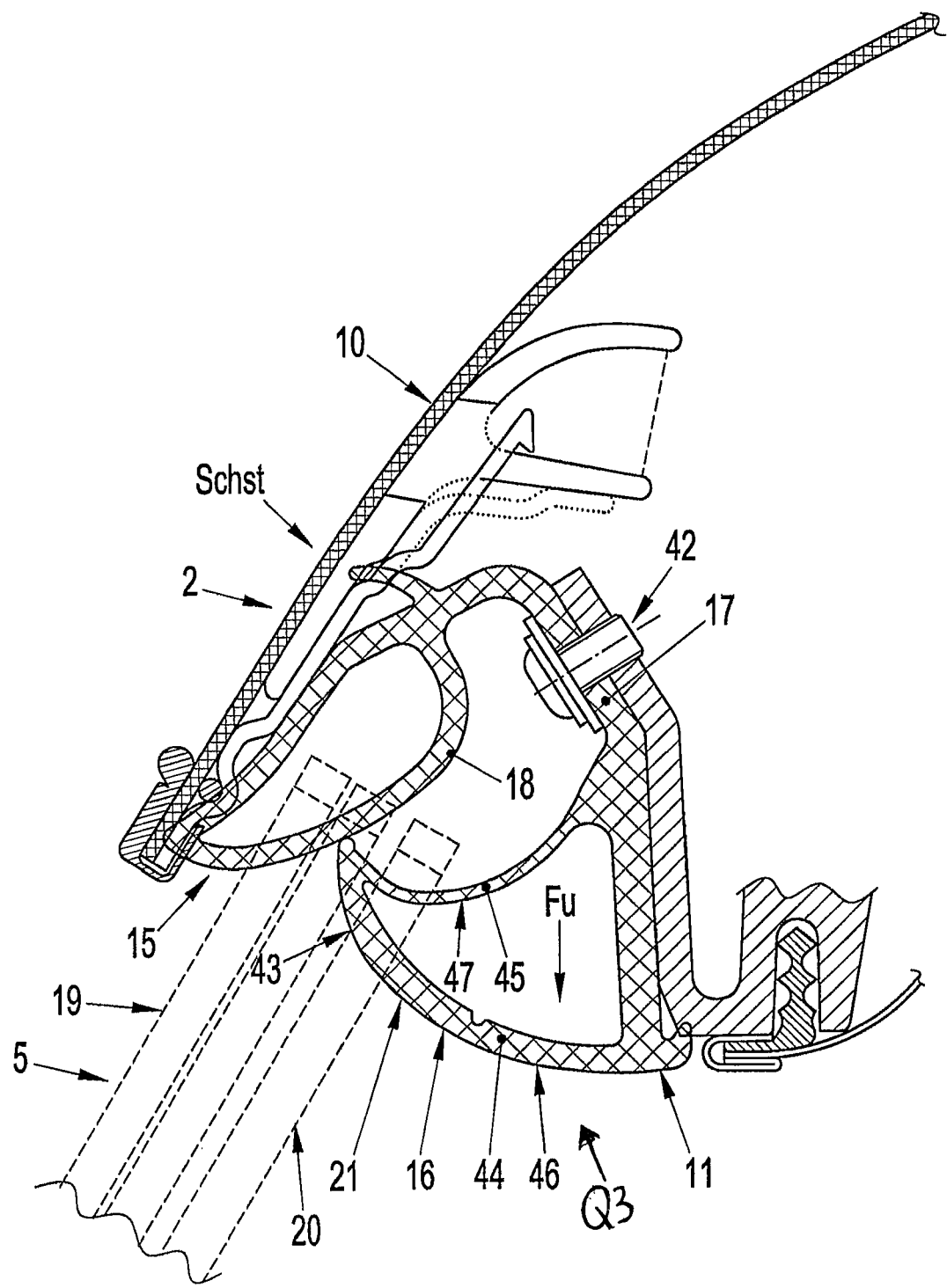
FIG. 4 illustrates an enlarged cross-sectional view along sectional line IV-IV of FIG. 1 in a rear section of the collapsible roof.

Referring now to FIGS. 2, 3, and 4, with continual reference to FIG. 1, sealing mechanism 7 will be described in greater detail. Sealing mechanism 7 includes a seal 11. Seal 11 is held in position on frame element 8 of top rail 9. Seal 11 acts between frame element 8 and a folding top zone 12 of roof 2. Seal 11 is formed from rubber, plastic, or the like.

Seal 11 has approximately equal and functionally similar cross-sections Q1, Q2, and Q3 between a front section Vdv, a middle section Vdm, and a rear section Vdh of collapsible roof 2. Roof sections Vdv, Vdm, and Vdh are defined by extended sectional lines II-II, III-III, and IV-IV shown in FIG. 1. Sectional lines II-II, III-III, and IV-IV are approximately radial with respect to a curved line B1. The curved lines B1, also known as E-lines, are oriented between forward windshield frame 13 and a rearward body section 14 of vehicle body 3 as seen in the longitudinal vehicle direction A-A.

FIG. 2 illustrates an enlarged cross-sectional view along sectional line II-II of FIG. 1 in the front roof section Vdv and thereby illustrates cross-section Q1 of seal 11. FIG. 3 illustrates an enlarged cross-sectional view along sectional line III-III of FIG. 1 in the middle roof section Vdm and thereby illustrates cross-section Q2 of seal 11. FIG. 4 illustrates an enlarged cross-sectional view along sectional line IV-IV of FIG. 1 in the rear roof section Vdh and thereby illustrates cross-section Q3 of seal 11.

Seal 11 has an outer tubing section 15, an inner tubing section 16, and a transverse base 17. Tubing sections 15 and 16 lie opposite to one another as seen in the transverse direction B-B of vehicle 1. Tubing sections 15 and 16 hang from transverse base 17. Transverse base 17 lies in the transverse vehicle direction B-B.

Outer tubing section 15 includes a first sealing section 18 and a third sealing section 22. Inner tubing section 16 includes a second sealing section 21 and a fourth sealing section 25. Outer tubing section 15 cooperates through first sealing section 18 with outer side 19 of a window pane 5 when the pane is in the closed window position. Outer tubing section 15 and inner tubing section 16 cooperate with one another through first sealing section 18 of outer tubing section 15 and second sealing section 21 of inner tubing section 16.

Outer tubing section 15 is supported by third sealing section 22 on an inner side 23 of a side molding 24 of frame element 8. As indicated, frame element 8 is a component of top rail 9. Inner tubing section 16 is connected to fourth sealing section 25 by pressure exerted on an upright wall 26 of frame element 8 or side molding 24.

In the front roof section Vdv, shown in FIG. 2, seal 11 is supported by side molding 24. Side molding 24 has a retaining region 27. Retaining region 27 has a U-shaped cross section with a base 28 and side pieces 29 and 30. In this embodiment, wall 26 is identical to side pieces 29 and 30. Side piece 30 surrounds a retaining insert Hes of seal 11 at least section-wise. For this reason, a barbed hook 31 is located on side piece 30. Hook 31 penetrates into a corresponding recess 32 of seal 11 in a form-fit manner. An extension 33 is located on side piece 29 on which a local thickening 34 of seal 11 is positively fitted.

In the middle roof section Vdm, shown in FIG. 3, third sealing section 22 of outer tubing section 15 of seal 11 has one or more sealing lips 35 and 36. Sealing lips 35 and 36 have at least an indirect functional connection with inner side 37 of cover 10. A roof guide 38 of frame element 8 has a retaining section 39. Retaining section 39 is for transverse base 17 of seal 11 and wall sections 40 and 41 of seal 11. Transverse base 17 is attached with the aid of a removable retaining means, e.g., screws 42, to retaining section 39. Seal 11 is formed similarly in the region of rear roof section Vdh as in middle roof section Vdm and front roof section Vdv.

As shown in FIGS. 2, 3, and 4, first sealing section 18 of outer tubing section 15 of seal 11 is convex or rounded. As described, first sealing section 18 is positioned at outer side 19 of window pane 5 when the pane is in the closed window position. In contrast to being convex or rounded, second sealing section 21 of inner tubing section 16 has the shape of a hook 43 with a lower wall 44 and an upper wall 45. Lower and upper walls 44 and 45 respectively have bows 46 and 47. Bows 46 and 47 are formed convexly toward the underside of the vehicle Fu and end in a point which contacts inner side 20 of window pane 5 when the pane is in the closed window position. Bows 46 and 47 are designed so that lower wall 44 lies against window pane 5 at least section-wise through the molding and upper wall 45 supports the molding of lower wall 44 through the narrowing of bow 47.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An assembly for a vehicle, comprising:
   a collapsible roof having a top rail with a frame element running along a longitudinal side of the roof; and
   a sealing mechanism having a seal configured to receive and seal a window pane inserted therein, wherein the seal runs along the longitudinal side of the roof and is attached to the frame element;

wherein the seal has a similar cross-section between front, middle, and rear sections of the roof, wherein the seal is attached to the frame element in the front, middle, and rear sections of the roof;

wherein the seal has an outer tubing section, an inner tubing section, and a transverse base, wherein the tubing sections lie opposite to one another transversely to the longitudinal side of the roof, wherein the tubing sections hang from the transverse base;

wherein the outer tubing section includes a first sealing section and the inner tubing section includes a second sealing section;

wherein the outer tubing section cooperates through the first sealing section with an outer side of a window pane and the inner tubing section cooperates through the second sealing section with an inner side of the pane when the pane is inserted into the seal;

wherein the first sealing section of the outer tubing section is bowed;

wherein the second sealing section of the inner tubing section has the shape of a hook with a lower bow and an upper bow, wherein the bows are rounded and end in a point which contacts the inner side of a window pane when the pane is inserted into the seal.

2. The assembly of claim 1 wherein:
the outer tubing section includes a third sealing section, wherein the third sealing section is supported on the frame element.

3. The assembly of claim 2 wherein:
the frame element has an upright wall in the front section of the roof;
wherein the inner tubing section includes a fourth sealing section, wherein the fourth sealing section is supported on the upright wall of the frame element in the front section of the roof.

4. The assembly of claim 3 wherein:
the frame element has a U-shaped retaining region in the front section of the roof;
wherein the seal has a retaining insert;
wherein the retaining insert of the seal is in the retaining region to support the seal to the retaining region in the front section of the roof.

5. The assembly of claim 2 wherein:
the third sealing section of the outer tubing section includes one or more sealing lips in the middle section of the roof, wherein the sealing lips cooperate with the frame element in the middle section of the roof.

6. The assembly of claim 1 wherein:
the frame element has a retaining section in the middle section of the roof;
wherein the transverse base of the seal is attached to the retaining section of the frame element in the middle section of the roof.

7. The assembly of claim 6 wherein:
a removable retaining means is between the transverse base and the retaining section of the frame element.

8. A vehicle comprising:
a vehicle body having a side door on a longitudinal side of the vehicle body and a movable window pane associated with the side door;
a collapsible roof having a flexible cover and a top rail supporting the cover, wherein the top rail is movable to a closed position in which the cover extends over a passenger compartment of the vehicle body with the top rail extending along the longitudinal side of the vehicle body;
wherein the top rail includes a frame element running along a longitudinal side of the roof;
a sealing mechanism having a seal running along the longitudinal side of the roof and attached to the frame element, wherein the seal is configured to receive and seal a window pane inserted therein when the roof is in the closed position;
wherein the seal has a similar cross-section between front, middle, and rear sections of the roof, wherein the seal is attached to the frame element in the front, middle, and rear sections of the roof;
wherein the seal has an outer tubing section, an inner tubing section, and a transverse base, wherein the tubing sections lie opposite to one another transversely to the longitudinal side of the roof, wherein the tubing sections hang from the transverse base;
wherein the outer tubing section includes a first sealing section and the inner tubing section includes a second sealing section;
wherein the outer tubing section cooperates through the first sealing section with an outer side of a window pane and the inner tubing section cooperates through the second sealing section with an inner side of the pane when the pane is inserted into the seal;
wherein the first sealing section of the outer tubing section is bowed;
wherein the second sealing section of the inner tubing section has the shape of a hook with a lower bow and an upper bow, wherein the bows are rounded toward the underside of the vehicle body and end in a point which contacts the inner side of a window pane when the pane is inserted into the seal.

9. The vehicle of claim 8 wherein:
the outer tubing section includes a third sealing section, wherein the third sealing section is supported on the frame element.

10. The vehicle of claim 9 wherein:
the frame element has an upright wall in the front section of the roof;
wherein the inner tubing section includes a fourth sealing section, wherein the fourth sealing section is supported on the upright wall of the frame element in the front section of the roof.

11. The vehicle of claim 9 wherein:
the frame element has a U-shaped retaining region in the front section of the roof;
wherein the seal has a retaining insert;
wherein the retaining insert of the seal is in the retaining region to support the seal to the retaining region in the front section of the roof.

12. The vehicle of claim 9 wherein:
the third sealing section of the outer tubing section includes one or more sealing lips in the middle section of the roof, wherein the sealing lips cooperate with the frame element in the middle section of the roof.

13. The vehicle of claim 8 wherein:
the frame element has a retaining section in the middle section of the roof;
wherein the transverse base of the seal is attached to the retaining section of the frame element in the middle section of the roof.

\* \* \* \* \*